US011872719B2

(12) United States Patent
Webster

(10) Patent No.: US 11,872,719 B2
(45) Date of Patent: Jan. 16, 2024

(54) FEED ROLLS HAVING FLUTE ASSEMBLIES OF MATINGLY ENGAGEABLE MOUNTS AND FLUTE INSERT ELEMENTS

(71) Applicant: Webco Mill Supply Ltd., Hope (CA)

(72) Inventor: Brian Webster, Hope (CA)

(73) Assignee: Webco Mill Supply Ltd., Hope (CA)

( * ) Notice: Subject to any disclaimer, the term of this patent is extended or adjusted under 35 U.S.C. 154(b) by 260 days.

(21) Appl. No.: 17/203,164

(22) Filed: Mar. 16, 2021

(65) Prior Publication Data

US 2021/0268682 A1 Sep. 2, 2021

Related U.S. Application Data

(63) Continuation of application No. 15/486,222, filed on Apr. 12, 2017, now Pat. No. 10,974,413.

(51) Int. Cl.
*B27B 31/00* (2006.01)
*B27C 1/12* (2006.01)
(Continued)

(52) U.S. Cl.
CPC ............ *B27B 31/003* (2013.01); *B27B 25/02* (2013.01); *B27C 1/12* (2013.01); *B27L 1/00* (2013.01); *B27L 1/10* (2013.01)

(58) Field of Classification Search
CPC ....... B27B 25/02; B27B 31/003; B27L 1/025; B27L 1/04; B27L 1/045; B27L 1/05;
(Continued)

(56) References Cited

U.S. PATENT DOCUMENTS 3,667,584 A * 6/1972 Karlsson ................. B27B 25/02 492/36
4,658,875 A 4/1987 Grabovac
(Continued)

FOREIGN PATENT DOCUMENTS

CA 2323903 3/2002
EP 1186388 B1 8/2004

OTHER PUBLICATIONS

International Search Report and Written Opinion of International Patent Application Publication No. PCT/CA2018/050447 filed Apr. 11, 2018.

*Primary Examiner* — Katrina M Stransky
*Assistant Examiner* — Jared O Brown
(74) *Attorney, Agent, or Firm* — Oyen Wiggs Green & Mutala LLP; Nicholas Garner

(57) ABSTRACT

A feed roll comprises a roll having a rotary axis, flutes fixed on the roll, mounts fixed on the roll between the flutes, each mount having a seat spaced apart from the outer surface of the roll and replaceable flute elements detachably and matingly engaged in the seats of respective mounts and extending outward beyond the mounts. The replaceable flute insert element comprises an elongated plate body having an inner longitudinal edge, an outer longitudinal edge, and a backing face extending between the inner longitudinal edge and the outer longitudinal edge and the inner longitudinal edge and the backing face configured to matingly engage the seat of the mount. The flute insert element further comprises the outer longitudinal edge being formed with a traction element and the plate body having a plurality of bolt holes therethrough for registering with the bolt holes of the mount element when the plate body and the seat are matingly engaged.

20 Claims, 8 Drawing Sheets

(51) Int. Cl.
*B27B 25/02* (2006.01)
*B27L 1/10* (2006.01)
*B27L 1/00* (2006.01)

(58) Field of Classification Search
CPC .. B27L 1/08; B27L 1/10; A01G 23/08; A01G 23/083; A01G 23/095; A01G 23/0955; B02C 18/186
USPC ......... 144/242.1, 246.1, 248.2, 248.3, 248.5, 144/248.6, 248.7
See application file for complete search history.

(56) References Cited

U.S. PATENT DOCUMENTS

| | | | | |
|---|---|---|---|---|
| 5,044,570 | A | 9/1991 | Montgomery | |
| 5,944,078 | A | 8/1999 | Lindholm | |
| 5,950,945 | A | 9/1999 | Schaller | |
| 6,253,813 | B1 * | 7/2001 | Kube | B27B 25/02 144/250.1 |
| 6,422,277 | B1 | 7/2002 | Kube et al. | |
| 6,764,035 | B2 | 7/2004 | Denis et al. | |
| 7,350,548 | B1 | 4/2008 | Cholewczynski et al. | |
| 7,565,921 | B2 | 7/2009 | Roy | |
| 7,882,869 | B2 * | 2/2011 | Kube | B27L 1/045 144/208.1 |
| 7,938,155 | B2 * | 5/2011 | Maietta | B27L 11/005 144/218 |
| 8,186,611 | B1 | 5/2012 | Boer et al. | |
| 8,256,476 | B2 | 9/2012 | Cholewczynski et al. | |
| 10,124,509 | B2 | 11/2018 | Runquist et al. | |
| 10,974,413 | B2 | 4/2021 | Webster | |
| 2002/0062879 | A1 | 5/2002 | Johnson et al. | |
| 2003/0222164 | A1 | 12/2003 | Denis et al. | |
| 2008/0115859 | A1 * | 5/2008 | Roy | B27B 25/02 144/248.7 |
| 2008/0298909 | A1 | 12/2008 | Gaudreault | |
| 2010/0108195 | A1 | 5/2010 | Durant et al. | |
| 2010/0154932 | A1 | 6/2010 | Cholewczynski et al. | |
| 2014/0319260 | A1 * | 10/2014 | Breja | B02C 18/186 241/294 |
| 2016/0045962 | A1 | 2/2016 | Tanaka et al. | |
| 2018/0050465 | A1 * | 2/2018 | Martin | B27B 25/02 |

* cited by examiner

FEED ROLLS HAVING FLUTE ASSEMBLIES OF MATINGLY ENGAGEABLE MOUNTS AND FLUTE INSERT ELEMENTS

CROSS-REFERENCE TO RELATED APPLICATION

This application claims priority from U.S. application Ser. No. 15/486,222 filed 12 Apr. 2017 and entitled FEED ROLLS HAVING FLUTE ASSEMBLIES OF MATINGLY ENGAGEABLE MOUNTS AND FLUTE INSERT ELEMENTS, which is hereby incorporated herein by reference for all purposes. For purposes of the United States of America, this application claims the benefit under 35 U.S.C. § 119 of U.S. application Ser. No. 15/486,222 filed 12 Apr. 2017 and entitled FEED ROLLS HAVING FLUTE ASSEMBLIES OF MATINGLY ENGAGEABLE MOUNTS AND FLUTE INSERT ELEMENTS.

BACKGROUND OF THE INVENTION

Field of Invention

The present invention relates generally to powered feed rolls of the type used, for example, in feeding and discharging logs to and from the barkers.

Description of Related Art

In lumber mills and other settings, logs are fed into and discharged from various machines that operate on the logs. A common arrangement for feeding and discharging logs has upper and lower spaced pairs of driven feed rolls. Each feed roll has generally cylindrical roll driven to rotate about its longitudinal axis. Flutes are arranged on the outer surface of the roll to cradle, grip and propel the logs tangentially to the rotation of the feed roll.

Flutes are located on the outer surface of the roll in circumferentially matched pairs, and are typically arranged symmetrically about a central cross-section of the feed roll perpendicular to and at the approximate center of the longitudinal axis of the feed roll. In a typical arrangement, the end of each flute nearest to the central cross-section is displaced circumferentially from its opposite end, such that the major axis of the flute forms an angle with the longitudinal axis of the roll. To provide a cradle for the logs, the complementing flutes taper toward the central cross-section of the roll (i.e., the radially outward extent of the flutes become closer to the feed roll's longitudinal axis) in a V-shaped configuration. The radially outward sides of the flutes are typically provided with a serrated configuration to improve traction with logs.

In operation, the radially outward sides of the flutes engage logs, and the V-shaped cradle configuration of the matched flute pairs works to center logs over the central cross-section of the roll. Feed rolls are often operated to propel logs at high speeds, and speeds as great as 10 linear feet per second are common. The result of this is that flutes are exposed to strong forces and wear. Due to the centering action of the V-shaped cradle configuration, flutes experience the greatest wear in their central section.

In the prior art, there are feed rolls whose flutes comprise replaceable flute inserts. In these feed rolls, the replaceable flute inserts are bolted in position to anchoring elements welded to the roll. An example of these is shown in U.S. Pat. No. 6,253,813B1. In these feed rolls, anchors are welded to the outer surface of the roll. Each anchor provides a side face that extends outwardly from the outer surface of the roll, and flute inserts are held in butting relation to the side face by bolts. The flute inserts are also configured so that at least part of their radially inner edge bears directly against the outer surface of the roll. The advantage of this configuration is that the side face supports the flute against forces tangential to the roll, and the bearing of the radially inner edges directly against the outer surface reduces the load on the bolts from force applied by logs to the radially outward sides of the flute inserts.

A potential disadvantage identified in the above-described replaceable flute feed rolls arises from the fact that in practice the bolt holes provided on the anchors are often made oblong in order that flute insert elements can be positioned to bear against the outer surface of the roll notwithstanding variations in the position of anchors relative to the outer surface of the roll (such as may be introduced in welding the anchors to the roll). In use, strong forces acting on the flute elements sometimes cause the bolts to slip relative to the anchors, with resulting outward displacement of the flute insert elements. This in turn may expose the displaced flute to even greater forces, and may result in damage to the flute insert element or the bolts that hold it to the anchor.

A further limitation of some prior art feed rolls is that the strong forces acting on the flute elements cause the flute elements to move relative to the outer surface of the roll. This causes friction and wear between the contacting surfaces of the flute elements and the roll.

The foregoing examples of the related art and limitations related thereto are intended to be illustrative and not exclusive. Other limitations of the related art will be apparent to those of skill in the art upon a reading of the specification and a study of the drawings.

The foregoing examples of the related art and limitations related thereto are intended to be illustrative and not exclusive. Other limitations of the related art will be apparent to those of skill in the art upon a reading of the specification and a study of the drawings.

SUMMARY OF THE INVENTION

According to a first embodiment of the present invention there is disclosed a feed roll comprising a roll having a rotary axis, two complementing sets of flutes fixed on the roll, two complementing sets of mounts fixed on the roll between the sets of flutes, each mount having a seat spaced apart from the outer surface of the roll and replaceable flute elements detachably and matingly engaged in the seats of respective mounts and extending outward beyond the mounts.

The mount may have a first face spaced outwardly apart from the outer surface of the roll and a second face outward of the first face, and the first and second faces define, at least in part, the seat. The seat may be defined, at least in part, by a first face of the mount spaced outwardly apart from the outer surface of the roll and a second face of the mount outward of the first face. Each mount may have a base portion adjacent to the outer surface of the roll and a back portion outward of the base portion, and the base portion and the backing portion define, at least in part, the seat.

The second face may extend outwardly from the first face. The first face and the second face may form an angle of 90 degrees or less. Each flute element may comprise an inner face that butts against the first face of a respective mount. Each mount may comprise an inner stop at an inner end thereof. The inner stop of each mount may comprise a beveled inner edge that is generally orthogonal to the rotary axis of the roll. Each mount may comprise an outer stop at an outer end thereof. The outer stop of each mount may be joined to an inner end of a respective flute.

The seat may be configured to support the replaceable flute elements against motion in a radially inward direction and against motion in a direction opposite rotation of the roll about the rotary axis. The seat may be configured to support the replaceable flute elements against motion in an axial direction of the roll.

A threaded hole defined through each flute element may be registered with a threaded hole of a respective mount, and wherein the thread of the hole through the flute element is matched to the thread of the hole through the mount. A threaded hole defined through each flute element may be registered with a threaded hole of a respective mount, and wherein the thread of the hole through the flute element is continuous with the thread of the hole through the mount.

According to a further embodiment of the present invention there is disclosed a feed roll comprising a cylindrical roll, complementing sets of outer flutes on the roll and spaced apart centrally of the roll, complementing sets of mounts fixed on the roll between the sets of outer flutes, each mount having a seat spaced apart from the outer surface of the roll and replaceable flute elements detachably and matingly engaged in the seats of respective mounts and continuing toward the longitudinal center of the roll from the outer flutes, the flute elements extending outward beyond the mounts.

Each mount may have a first face spaced outwardly apart from the outer surface of the roll and a second face outward of the first face, and the first and second faces define, at least in part, the seat. The seat may be defined, at least in part, by a first face of the mount spaced outwardly apart from the outer surface of the roll and a second face of the mount outward of the first face. Each mount may have a base portion adjacent to the outer surface of the roll and a back portion outward of the base portion, and the base portion and the backing portion define, at least in part, the seat. The second face may extend outwardly from the first face.

The first face and the second face may form an angle of 90 degrees or less. Each flute element may comprise an inner face that butts against the first face of a respective mount. Each mount may comprise an inner stop at an inner end thereof. The inner stop of each mount may comprise a beveled inner edge that is generally orthogonal to the rotary axis of the roll. Each mount may comprise an outer stop at an outer end thereof. The outer stop of each mount may be joined to an inner end of a respective flute.

The seat may be configured to support the replaceable flute elements against motion in a radially inward direction and against motion in a direction opposite rotation of the roll about the rotary axis. The seat may be configured to support the replaceable flute elements against motion in an axial direction of the roll. A threaded hole defined through each flute element may be registered with a threaded hole of a respective mount, and wherein the thread of the hole through the flute element is matched to the thread of the hole through the mount.

According to a further embodiment of the present invention there is disclosed a feed roll comprising a cylindrical roll having an internal hub flange for a drive connection and complementing outer sets of outer flute sections fixed on the outer surface of the roll and extending toward the longitudinal center of the roll from opposite ends of the roll, each of the outer flute sections having an inner end offset circumferentially of the roll from an outer end with respective flute sections in each outer set having their inner ends directly opposite one another and spaced apart equally from the longitudinal center. The feed roll further comprises complementing inner sets of mounts fixed on the outer surface of the roll and extending to the longitudinal center of the roll from the inner ends of the outer flute sections, the inner sets intersecting one another in a general V configuration at the longitudinal center, each mount having a seat spaced apart from the outer surface of the roll and replaceable sets of flute elements, detachably and matingly engaged in the seats of respective mounts, with each flute element extending outwardly beyond the mounts.

Each mount may have a first face spaced outwardly apart from the outer surface of the roll and a second face outward of the first face, and the first and second faces define, at least in part, the seat. The seat may be defined, at least in part, by a first face of the mount spaced outwardly apart from the outer surface of the roll and a second face of the mount outward of the first face.

Each mount may have a base portion adjacent to the outer surface of the roll and a back portion outward of the base portion, and the base portion and the backing portion define, at least in part, the seat. The base portion may constrain the flute element against motion in a first direction, the backing portion constrain the flute element against motion in a second direction that is orthogonal to the first direction. The first direction may be a radial direction of the roll. The second direction may be a rotational direction of the roll. The second direction may be tangential to the outer surface of the roll.

Each flute element may comprise an inner face that butts against the base portion of a respective mount. Each mount may comprise an inner stop at an inner end thereof. The inner stop of each mount may comprise a beveled inner edge that is generally orthogonal to the rotary axis of the roll. Each mount may comprise an outer stop at an outer end thereof. The outer stop of each mount may be joined to an inner end of a respective flute. A threaded hole defined through each flute element may be registered with a threaded hole of a respective mount, and wherein the thread of the hole through the flute element is matched to the thread of the hole through the mount.

According to a further embodiment of the present invention there is disclosed a replaceable flute insert element for use on a fluted roll having a mount element fixed in position and defining a seat with a set of bolt holes therethrough. The flute insert element comprises an elongated plate body having an inner longitudinal edge, an outer longitudinal edge, and a backing face extending between the inner longitudinal edge and the outer longitudinal edge and the inner longitudinal edge and the backing face configured to matingly engage the seat of the mount. The flue insert element further comprises the outer longitudinal edge being formed with a traction element and the plate body having a plurality of bolt holes therethrough for registering with the bolt holes of the mount element when the plate body and the seat are matingly engaged. The inner longitudinal edge may comprise a plurality of spaced apart recesses.

According to a further embodiment of the present invention there is disclosed a kit for retrofitting a feed roll comprising a set of complementing mounts, each mount having a base portion and a backing portion that together define a seat, the base portion having an arcuate face opposite and spaced apart from the seat and a set of complementing flute elements matingly engageable with the seats of mounts. The backing portion may be outward of the base portion.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Throughout the following description specific details are set forth in order to provide a more thorough understanding to persons skilled in the art. However, well known elements may not have been shown or described in detail in order to avoid unnecessarily obscuring the disclosure. Accordingly, the description and drawings are to be regarded in an illustrative, rather than a restrictive, sense.

Figure 1:
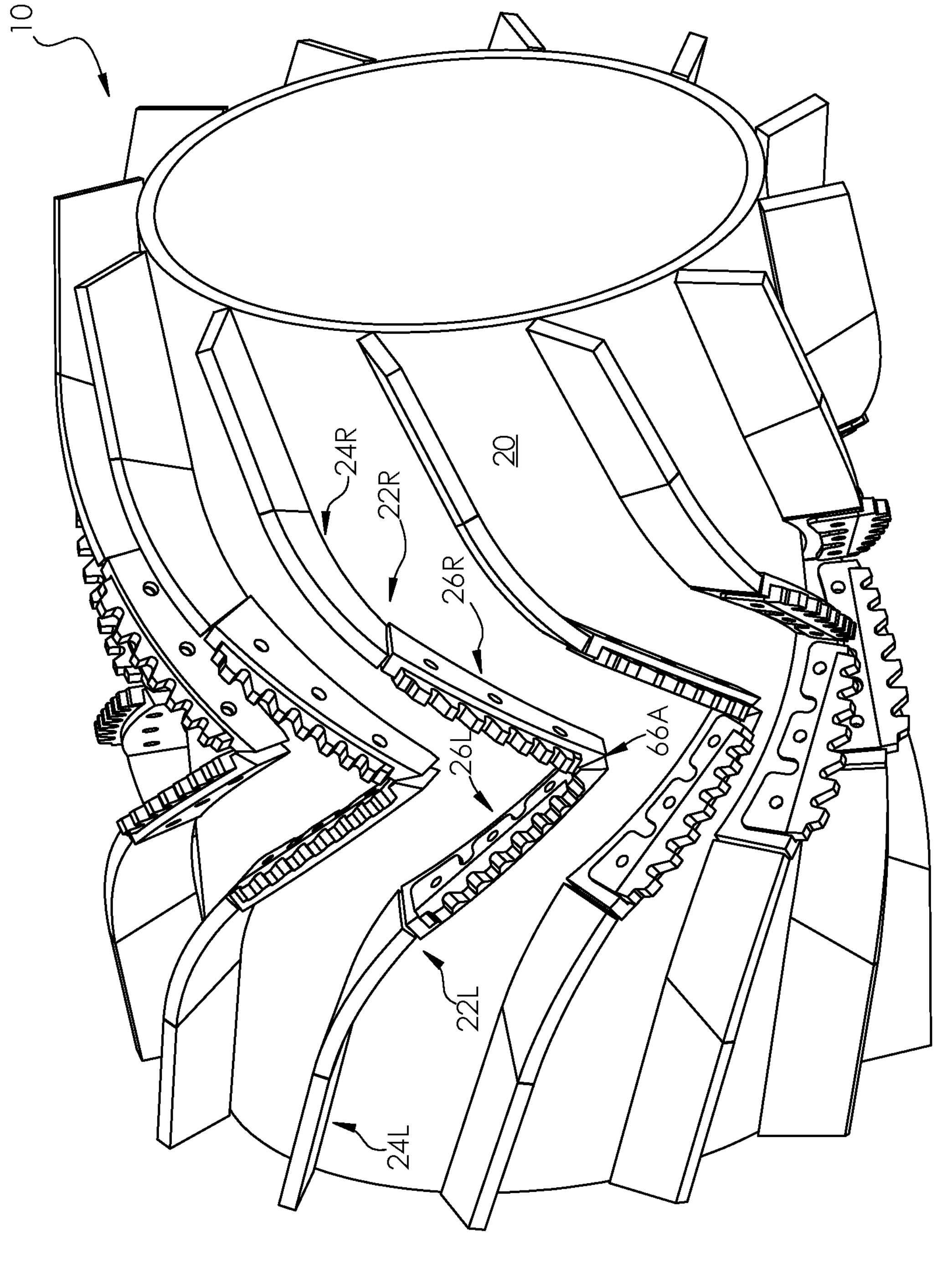
FIG. 1 is a perspective view of a feed roll according to an example embodiment.

FIG. 1 is a perspective view of a feed roll 10 according to an example embodiment. Feed roll 10 comprises a cylindrical body 20, which may consist of a length of steel pipe. Inside cylindrical body 20, and not visible in the drawings, is an annular flange provided with holes for receiving bolts to secure the flange to a driven hub. When driven, feed roll 10 rotates about its longitudinal axis.

The outer surface of body 20 is provided with left and right sets of complementing, circumferentially distributed flutes 22R-22L. The flutes each comprise fixed outer flutes 24R-24L, and inner flute assemblies 26R-26L. In the illustrated example, the feed roll 10 has 12 flutes in each right and left set which are equally spaced apart by 30°.

The outer flutes 24R-24L are mirror images of one another and are positioned so that their inner and outer ends are displaced with respect to one another circumferentially of the roll as seen, for example, in FIG. 1, and are welded in position. As can also be seen in FIG. 1, respective flute sections in each outer set have their inner ends directly opposite one another and are spaced apart equally from the longitudinal center of cylindrical body 20.

The flute assemblies 26R-26L are longitudinally between outer flutes 24R-24L, and are positioned so that their inner and outer ends are displaced with respect to one another circumferentially of the roll. Respective flute assemblies in each set have their inner ends directly opposite one another and are spaced apart equally from the longitudinal center of cylindrical body 20.

Figure 2:
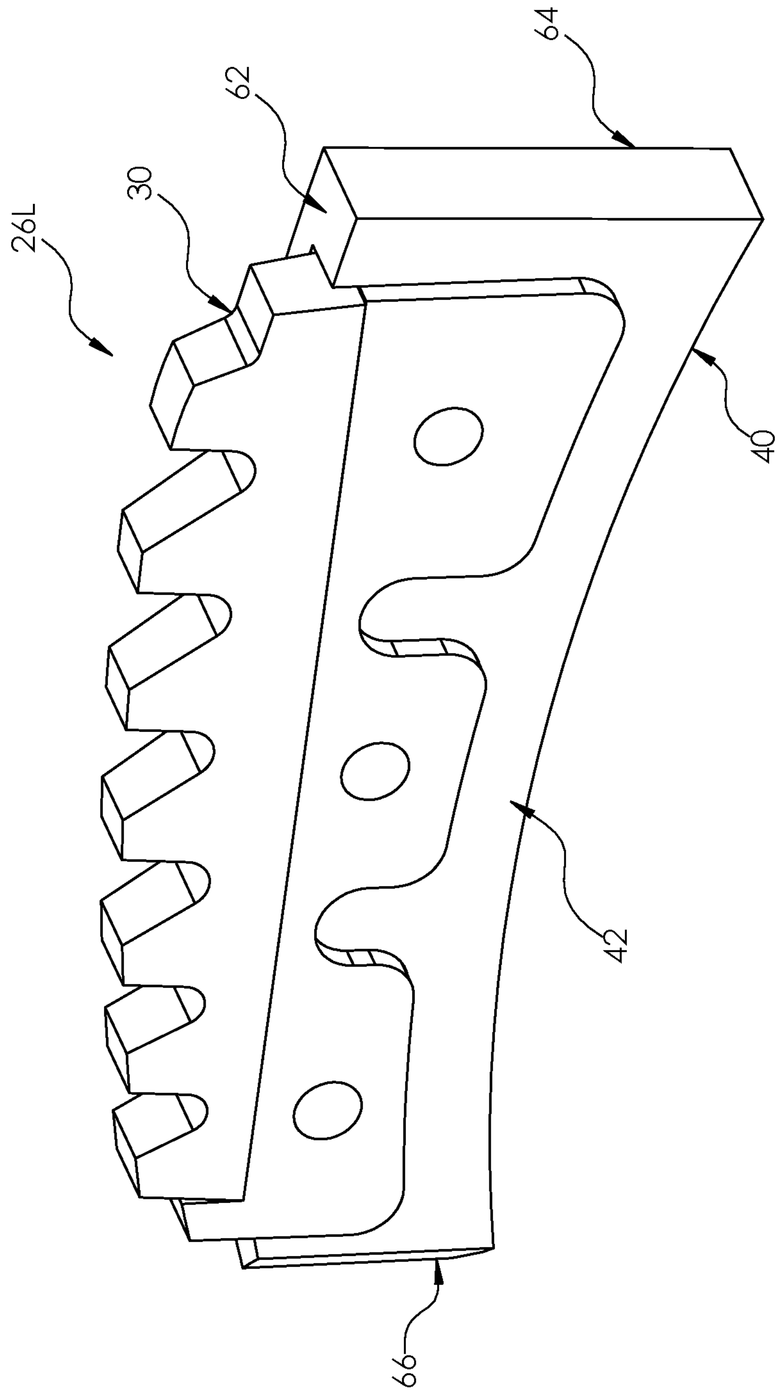
FIG. 2 is a perspective view of a flute assembly according to an example embodiment.
Figure 3A:
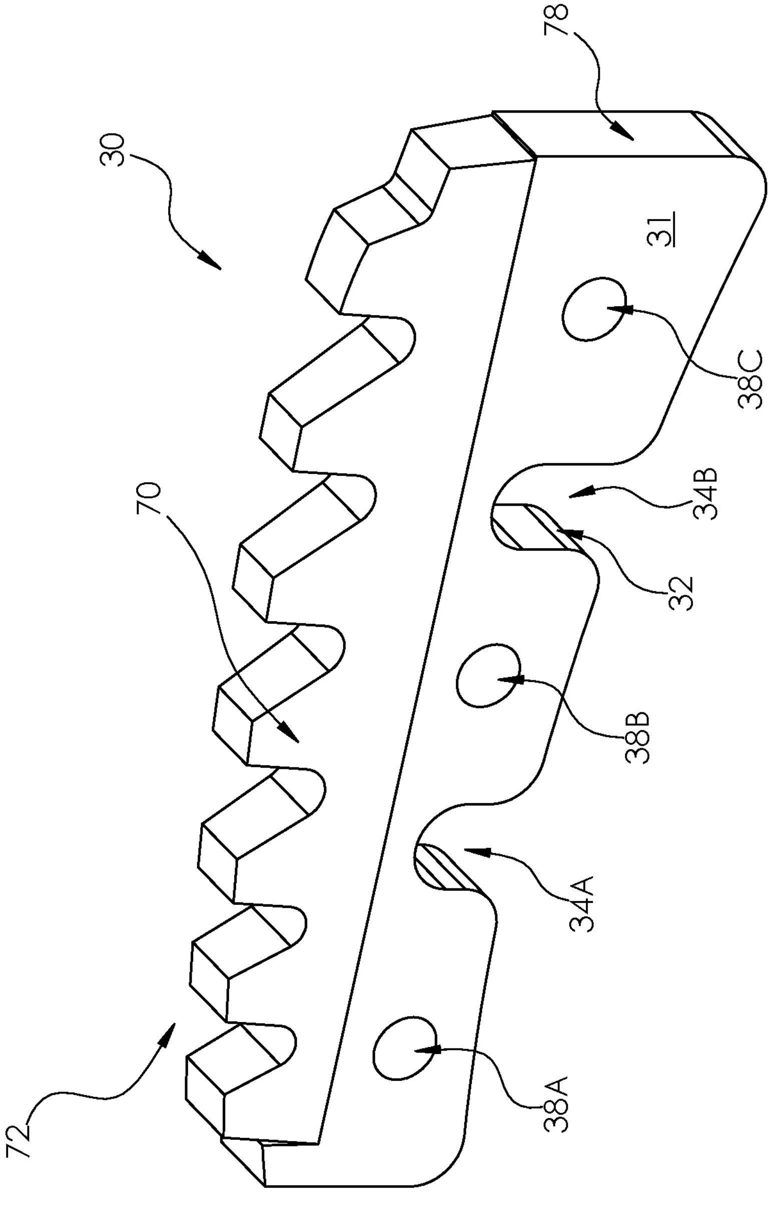
FIG. 3A is a perspective view of a flute insert element according to an example embodiment.
Figure 3B:
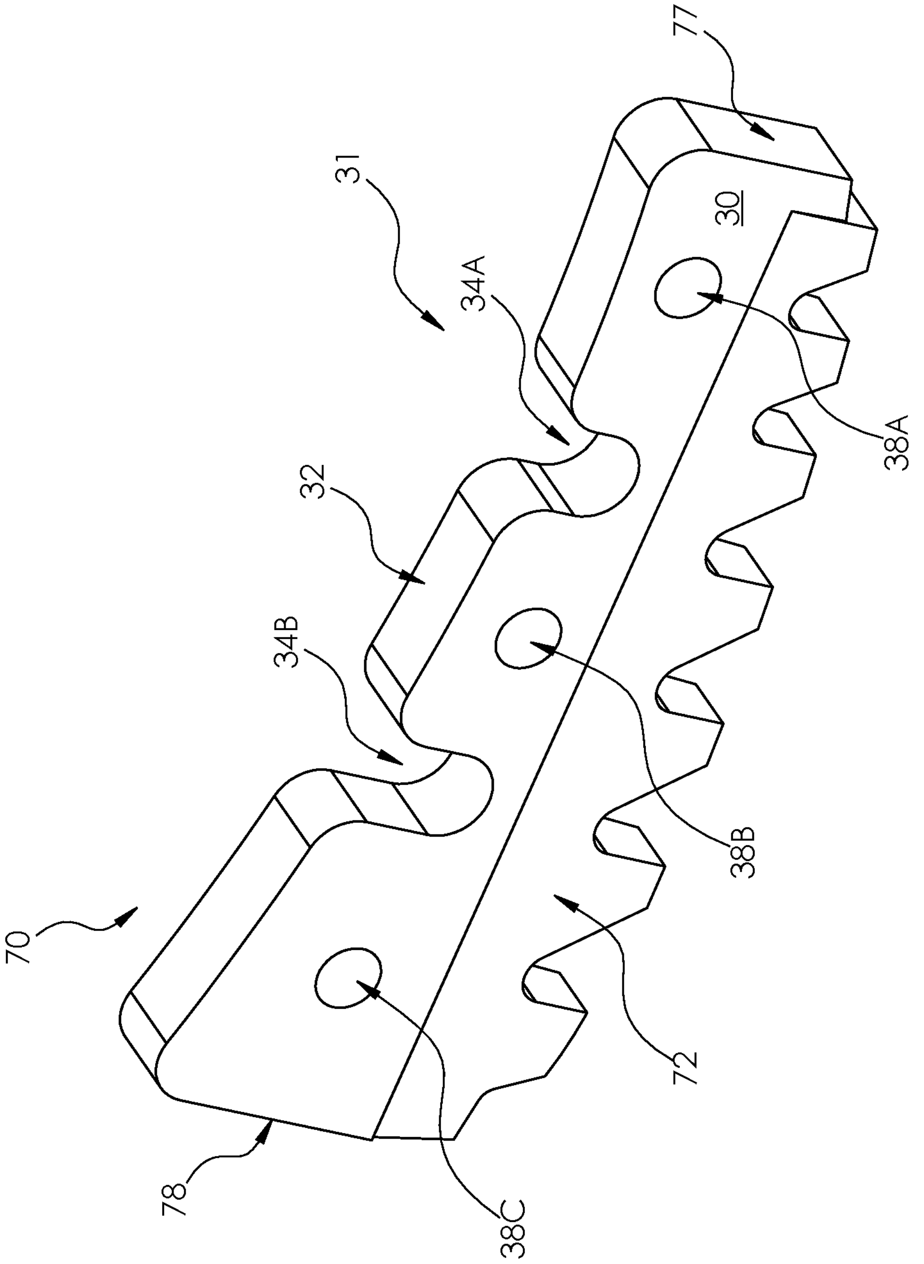
FIG. 3B is a different perspective view of the flute insert element shown in FIG. 3A.
Figure 4A:
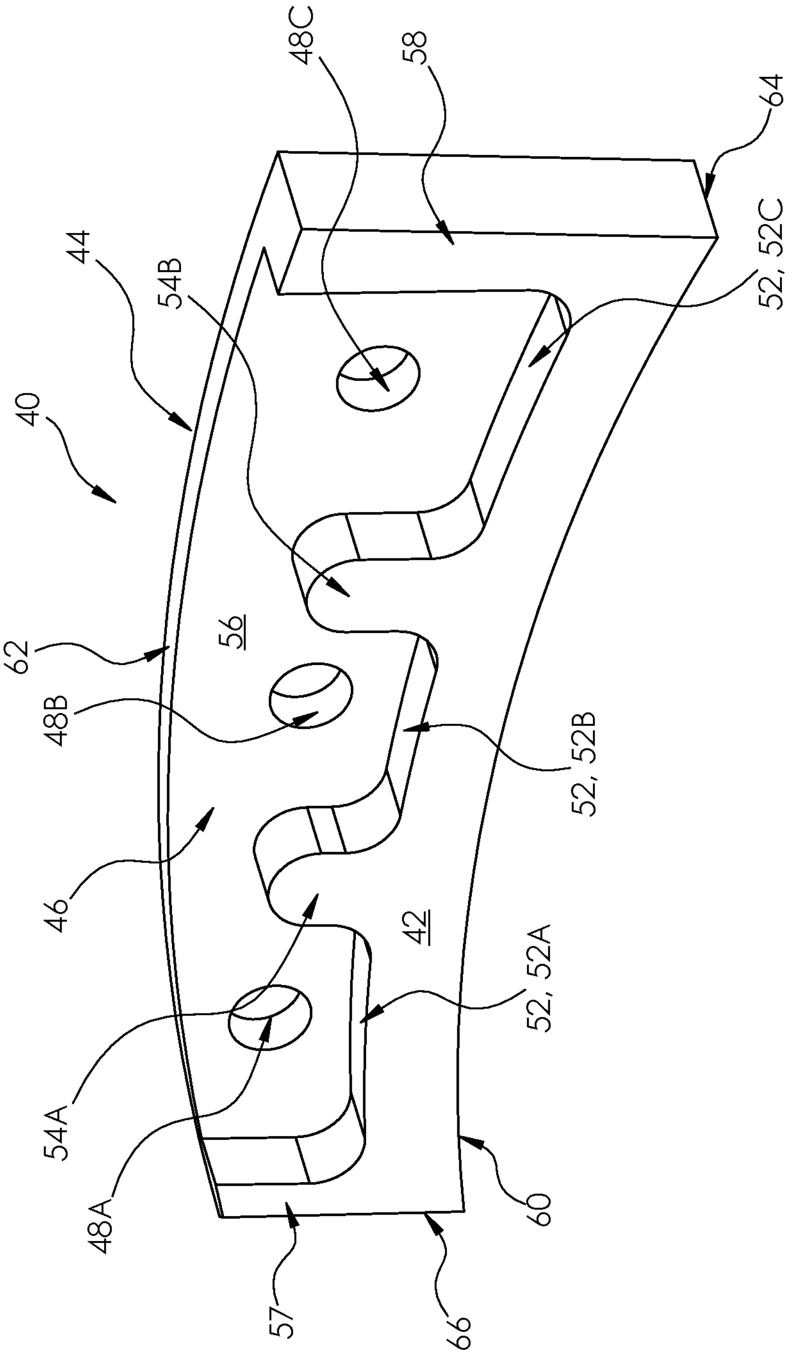
FIG. 4A is a perspective view of a mount according to an example embodiment.
Figure 4B:
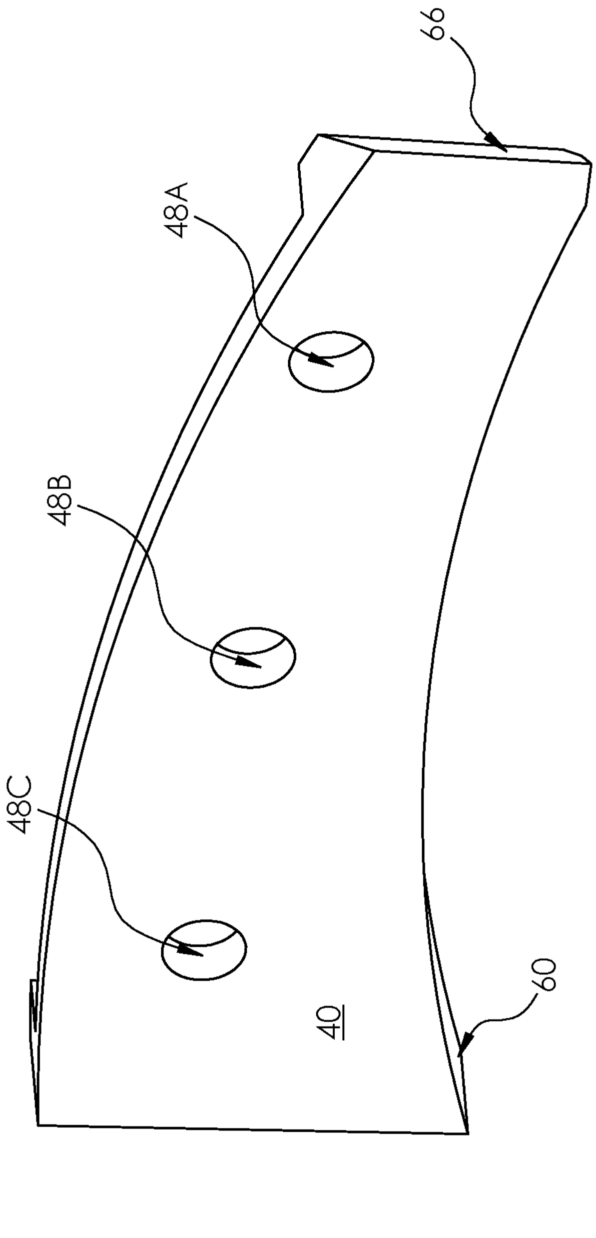
FIG. 4B is a different perspective view of the mount shown in FIG. 4A.
Figure 5:
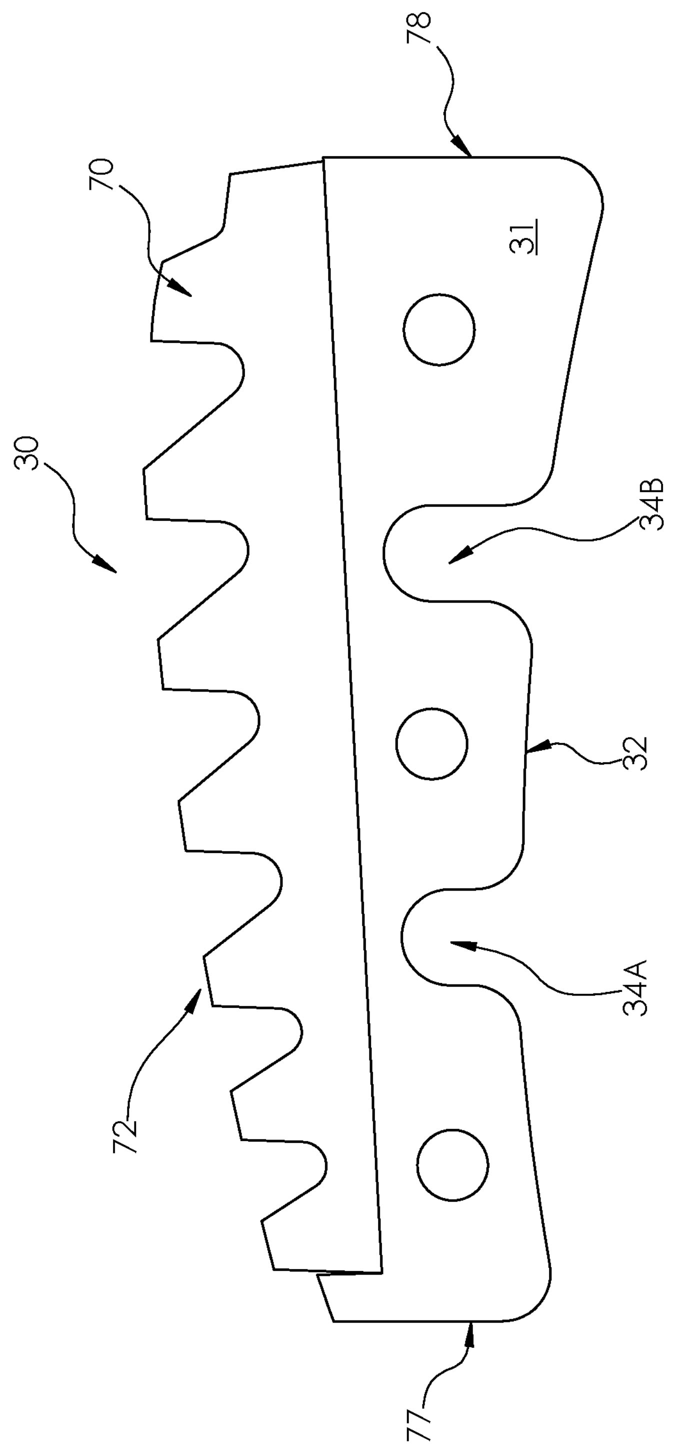
FIG. 5 is an elevation view of the flute insert element shown in FIG. 2.

FIG. 2 is an elevation view of flute assembly 26L, shown isolation. Flute assembly 26L comprises a flute element 30 seated in a mount 40. Features of flute assembly 26L are described below with reference to FIG. 2, and FIG. 3A and FIG. 3B, which show different perspective views of flute element 30, and FIG. 4A and FIG. 4B, which show different perspective views of mount 40, and also FIG. 5 and FIG. 6, which show elevation views of, respectively, flute element 30 and mount 40.

Mount 40 comprises a base portion 42 and a backing portion 44, located outward of base portion 42, that together define a seat 46. More specifically, base portion 42 has an outer face 52, which comprises face portions 52A, 52B and 52C separated by lugs 54A and 54B, which together with the adjoining mounting face 56 of backing portion 44 define seat 46. In the illustrated embodiment, outer face 52 of base portion 42 meets mounting face 56 of backing portion 44 at a 90 degree angle. In other embodiments, this angle between outer face 52 and mounting face 56 may be less than 90 degrees.

In the illustrated embodiment, mount 40 also comprises inner stop 57 and outer stop 58, both of which further define seat 46. Outer stop 58 is substantially the same width and depth as the inner end of the adjacent outer flute element 24L. Outer stop 58 may be joined to the inner end of outer flute element 24L, such as by welding, for example. A plurality of substantially equally spaced boreholes 48A, 48B and 48C are defined through backing portion 44 between inner stop 57 and outer stop 58. In some embodiments only a single borehole is provided through backing portion 44.

It will be observed that mount 40 has an arcuate inner edge 60 that is spaced apart from and radially inward of seat 46. More specifically, arcuate edge 60 is spaced apart from and generally opposite outer face 52 of base portion 42. As seen in FIG. 1, arcuate edge 60 abuts the outer surface of cylindrical body 20. The arcuate configuration of edge 60 provides for close contact between base portion 42 of mount 40 and the outer surface of cylindrical body 20. The arcuate configuration of edge 60 also facilitates affixation, such as by welding, of mount 40 onto outer surface of cylindrical body 20. In some embodiments, edge 60 comprises a compound curve, which may facilitate continuous butting contact between base portion 42 of mount 40 and the outer surface of cylindrical body 20.

Figure 6:
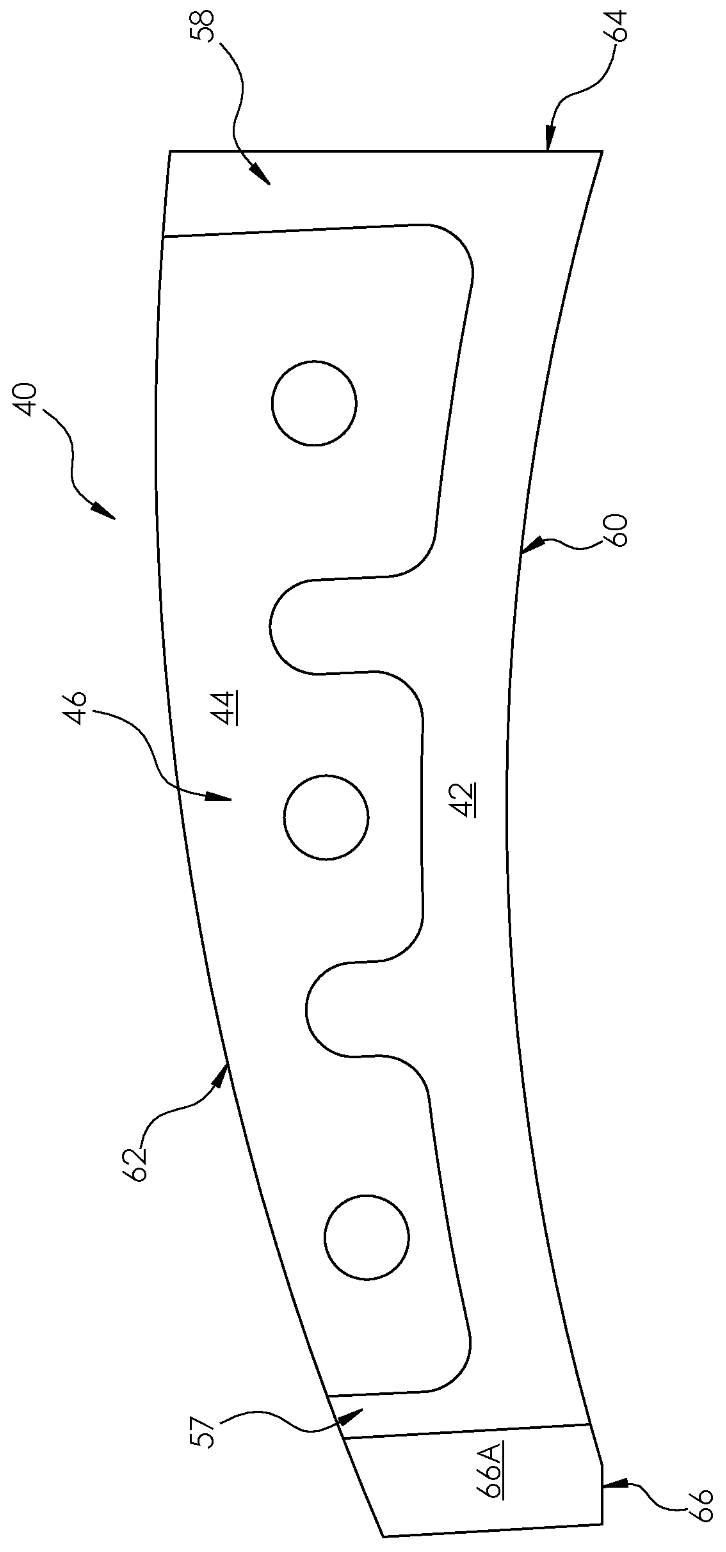
FIG. 6 is an elevation view of the mount shown in FIG. 2.

Arcuate inner edge 60 has a more inwardly located center and smaller radius than outer arcuate edge 62 of mount 40. As a result, mount 40 tapers from its outer end 64 to its inner end 66. As can be seen in FIG. 4 and FIG. 6, outer end 64 of mount 40 is wider ("higher" in FIG. 1) than inner end 66.

As best seen in FIG. 1, the inner end 66 of mount 40 is beveled to provide an inner edge 66A. The beveled inner edge 66A is relatively more closely aligned with the direction of rotational motion of feed roll 10 as compared with an edge perpendicular to the major axis of mount 40. In the illustrated embodiment, the beveled inner edge 66A is generally parallel to the cross-section of cylindrical body 20 (i.e., generally orthogonal to the rotary axis of feed roll 10), such that facing inner edges of complementing mounts are parallel to one another. This configuration facilitates a welded connection between the facing inner edges of complementing mounts on feed roll 10.

As shown in the drawings, flute element 30 comprises an elongated plate body 31 that is shaped for mating engagement with seat 46 of mount 40. In particular, body 31 comprises an inner face 32, which comprises three face portions separated by recesses 34A and 34B, and a backing face 36 that extends outwardly from inner face 32. Inner face 32 is complementary to outer face 52 of mount 40; more specifically, the curvature of inner face 32 matches the curvature of outer face 52. Backing face 36 is complementary to mounting face 56 of mount 40; more specifically, backing face 36 and mounting face 56 are both planar. Recesses 34A and 34B are formed on inner face 32 to receive lugs 54A and 54B of mount 40. Inner face 32 and backing face 36 form an angle that is complementary to the angle formed between outer face 52 and mounting face 56 that define seat 46. The described configuration provides for mating engagement of flute element 30 with seat 46 wherein inner face 32 abuts outer face 52 and backing face 34 abuts mounting face 56.

In the illustrated embodiment, plate body 31 has inner end 77 and outer end 78, and is dimensioned so that inner end 77 abuts inner stop 57 and outer end 78 abuts outer stop 58 when flute element 30 is matingly engaged with seat 46 of mount 40.

In the illustrated embodiment, the mating engagement of flute element 30 in seat 46 of mount 40 constrains the movement of flute element 30 in three orthogonal directions. In particular, base portion 42 inhibits travel of flute element 30 in a radially inward direction, backing portion 44 inhibits travel of flute element 30 in the direction opposite the rotation of feed roll 10, and stops 57 and 58 inhibit travel of flute 30 in the directions parallel to the longitudinal axis of feed roll 10. The mating engagement of lugs 54A and 54B in recesses 34A and 34B provides additional constraint on the movement of flute element 30 relative to mount 40.

The butting of inner face 32 of flute element 30 against outer face 52 of mount 40, which is provided by the mating engagement of flute element 30 in seat 46 of mount 40, provides a connection for transmitting radially-directed forces acting on flute element 30 though mount 40 to cylindrical body 20. Registration of boreholes 48A, 48B and 48C through mount 40 with corresponding boreholes 38A, 38B and 38C through flute element 30 is not affected by variations in the relative spatial arrangement of mount 40 and cylindrical body 20. As a result, there is no need to oversize the boreholes defined in mount 40 (or flute element 30) in order to both assure registration of boreholes 48A, 48B and 48C with boreholes 38A, 38B and 38C and provide force transmission from flute element 30 to cylindrical body 20.

Though omitted from the drawings so as not to obscure the disclosure, flute 30 may be detachably connected to mount 40 using bolts through boreholes 48A, 48B and 48C and boreholes 38A, 38B and 38C. Threads may be provided in boreholes 38A, 38B, 38C, 48A, 48B and 48C, and the threads formed in corresponding boreholes (i.e., those that are registered when flute element 30 is matingly engaged with mount 40) may be continuous. Alternatively, the threads in corresponding boreholes may be matched so that even if the thread is not continuous a single threaded bolt will mate in the registered boreholes of flute element 30 and mount 40 when flute element 30 is matingly engaged with seat 46 of mount 40. In some embodiment, threads are provided only in boreholes 48A, 48B, and 48C.

Serrated teeth 70 are provided along the outer arcuate edge 72 of flute element 30. Teeth 70, which may have their leading and trailing edges beveled, provide traction against logs fed into feed roller 10. The teeth are preferably progressively larger in depth and width from the inner end of 77 of each flute insert element to the wider outer end 78. In the illustrated embodiment, teeth 70 comprise high chromium steel, and are joined to plate body 31 by thermal brazing. In other embodiments, traction elements other than serrated teeth, such as conical spikes or carbide hardfacing, for example, may be used.

It will be noted that the flute assemblies 26R-26L are positioned relative to the outer flutes 24R-24L so that the outer ends of the mounts are generally aligned with the inner ends of the outer flutes. The flute elements are made sufficiently wider than the mounts to expose the teeth radially outward beyond the outer edge 62 of the mated mount.

It will be appreciated that the complementary right-sided flute elements and mounts are mirror images of the left-sided flute elements and mounts described above. The mounts 40 are positioned so that their inner and outer ends 66, 64 are displaced with respect to one another circumferentially of the roll as seen, for example, in FIG. 1.

Where a component is referred to above, unless otherwise indicated, reference to that component (including a reference to "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof.

For example:

- Though in the described example embodiments lugs 54A and 54B extend outward from base portion 42 of mount 40, in other embodiments, recesses may be formed in base portion 42 in place of lugs, and complementary lugs provided on flute element 30 in place of recesses 34A and 34B. Other complementary features between based portion 42 of mount 40 and plate body 31 of flute element 30 are also possible.
- Though in the drawings flute element 30 is shown as extending traversely beyond mount 40, flute element 30 may be made thinner so as to be flush with mount 40, or thinner still, so as to be recessed relative to mount 40 when matingly engaged in seat 46.
- Complementary pairs of mounts 40 may be joined at inner edges 66A, such as by a weld, or may be axially spaced apart as shown.
- Mount 40 is illustrated as being made from a single piece, such as by machining or casting, such that base portion 42 is continuous with inner stop 57 and outer stop 58, and all of these elements are of a piece with backing portion 44. In other embodiments, base portion 42 may not be continuous with either or both of inner stop 57 and outer stop 58, and these elements may be separately formed and affixed to backing portion 44.
- In the illustrated embodiment, base portion 42, inner stop 57 and outer stop 58 extend the full length, respectively of inner edge 60, inner end 66, and outer end 64. In other embodiments base portion 42 may not extend the full length of inner edge 60, inner stop 57 may not extend the full length of inner end 66, and outer stop 58 may not extend the full length of outer end 64.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

While specific embodiments of the invention have been described and illustrated, such embodiments should be considered illustrative of the invention only and not as limiting the invention as construed in accordance with the accompanying claims.

What is claimed is:

1. In combination, a replaceable flute element for a feed roll, and a mount via which the flute element is connectable to the feed roll, the flute element including a traction element configured to grip an outer surface of a log, the flute element including an elongated plate body having an inner longitudinal edge, the plate body having an outer longitudinal edge via which the traction element couples or is formed, the plate body having a flat backing face extending laterally between the inner and outer longitudinal edges thereof, the mount including one or more u-shaped sections in a longitudinal cross-section and being L-shaped in a lateral cross-section so as to form a seat to matingly engage with the flute element, and the plate body having one or more bolt holes extending therethrough for passing bolts therein to further secure the plate body to the mount.

2. The combination according to claim 1 wherein the plate body has spaced-apart first and second ends which extend parallel to one another.

3. The combination as claimed in claim 1, wherein the plate body of the flute element has spaced-apart ends and wherein the mount includes spaced-apart stops shaped to abut respective said ends of the plate body of the flute element.

4. The combination as claimed in claim 1, wherein mating engagement of the flute element in the seat of the mount constrains movement of the flute element in three orthogonal directions.

5. The combination as claimed in claim 1, wherein mating engagement of the flute element in the seat of the mount constrains movement of the flute element in a radially inward direction, in a direction opposite rotation of the feed roll, and in directions parallel to a longitudinal axis of the feed roll.

6. The combination as claimed in claim 1, wherein spaced-apart ends of the plate body, the inner longitudinal edge of the plate body and the flat backing face of the plate body are shaped to abut the seat of the mount.

7. The combination according to claim 1, wherein the plate body is solid.

8. The combination as claimed in claim 1, wherein the mount is shaped to extend along a full length of the flute element, and wherein the flute element extends along a length of the seat of the mount.

9. The combination as claimed in claim 1, wherein the traction element comprises serrated teeth disposed along the outer longitudinal edge of the plate body and wherein one or more of:

the serrated teeth are progressively larger in depth and width from a first end of the plate body to a second end of the plate body;

the serrated teeth are asymmetrical; and sides of the serrated teeth facing toward the first end of the plate body are steeper than sides of the serrated teeth facing toward the second end of the plate body.

10. The combination as claimed in claim 1, wherein the traction element includes one or more of i) hardfacing and ii) a member that is brazed to the plate body.

11. The combination as claimed in claim 1, wherein the plate body has first and second ends and wherein the plate body is tapered such that a distance between the inner longitudinal edge thereof and the outer longitudinal edge thereof is smaller at the first end thereof than at the second end thereof.

12. The combination as claimed in claim 1, wherein the plate body has first and second ends, wherein the first end of the plate body extends outwards at an acute angle relative to the inner longitudinal edge of the plate body and wherein the second end of the plate body extends outwards at an acute angle relative to the inner longitudinal edge of the plate body.

13. The combination as claimed in claim 1, wherein the bolt holes of the flute element are threaded.

14. The combination as claimed in claim 1, wherein the seat of the mount is spaced-apart from an outer surface of the feed roll.

15. The combination as claimed in claim 1, wherein the mount includes spaced-apart inner and outer stops and wherein the flute element extends from the inner stop to the outer stop.

16. The combination as claimed in claim 1, wherein the flute element has inner and outer ends and wherein the mount includes spaced-apart inner and outer stops which extend along and substantially enclose said inner and outer ends, respectively.

17. The combination as claimed in claim 1, wherein the mount includes spaced-apart stops between which the flute element is positioned and via which movement of the flute element relative to the mount is inhibited.

18. In combination, a replaceable flute element for a feed roll, and a mount with a seat shaped to matingly engage with the flute element, the flute element comprising a unitary elongated plate body having an inner longitudinal edge, an outer longitudinal edge, and a flat backing face extending between the inner longitudinal edge thereof and the outer longitudinal edge thereof, the inner longitudinal edge of the plate body extending perpendicular to the backing face of the plate body so as to matingly engage in the seat of the mount on the feed roll, the outer longitudinal edge of the plate body being formed with a traction element configured to grip an outer surface of a log, and the plate body having one or more bolt holes therethrough for passing bolts therein to secure the plate body to the mount; and wherein the mount comprises one or more u-shaped sections in a longitudinal cross-section and is L-shaped in a lateral cross-section.

19. In combination:

i) a replaceable flute element for a feed roll, the flute element comprising:

a unitary elongated plate body having an inner longitudinal edge, an outer longitudinal edge, and a flat backing face extending between the inner longitudinal edge and the outer longitudinal edge, the inner longitudinal edge extending perpendicular to the backing face for matingly engaging in a seat of a mount on the feed roll;

the outer longitudinal edge being formed with a traction element configured to grip an outer surface of a log;

the plate body having one or more bolt holes therethrough for passing bolts therein to secure the plate body to the mount;

the plate body having first and second ends and being tapered such that a distance between the inner longitudinal edge thereof and the outer longitudinal edge thereof is smaller at the first end of the plate body than at the second end of the plate body;

wherein the first end and the second end of the plate body extend parallel to each other;

wherein the inner longitudinal edge of the plate body is outwardly concave; and wherein corners between the inner longitudinal edge of the plate body and the first end and the second end of the plate body of the replaceable flute element are outwardly convex; and ii) said mount with said seat shaped to matingly engage with the flute element, wherein the ends of the plate body, the corners of the plate body, the inner longitudinal edge of the plate body and the flat backing face of the plate body are shaped to abut the seat of the mount.

20. The combination according to claim 19 wherein the corners of the plate body are continuously curved.

* * * * *